United States Patent [19]

Krause et al.

[11] Patent Number: 5,068,724
[45] Date of Patent: Nov. 26, 1991

[54] ADAPTIVE MOTION COMPENSATION FOR DIGITAL TELEVISION

[75] Inventors: Edward A. Krause, San Diego; Woo H. Paik, Encinitas; Vincent Liu; Jim Essserman, both of San Diego, all of Calif.

[73] Assignee: General Instrument Corporation, Hatboro, Pa.

[21] Appl. No.: 538,823

[22] Filed: Jun. 15, 1990

[51] Int. Cl.$^5$ ............................................. H04N 7/137
[52] U.S. Cl. ................................... 358/133; 358/105; 358/135; 358/136
[58] Field of Search ................. 358/133, 135, 136, 105

[56] References Cited

U.S. PATENT DOCUMENTS

| | | | |
|---|---|---|---|
| 4,546,386 | 10/1985 | Matsumoto et al. | 358/136 |
| 4,651,206 | 3/1987 | Ohki | 358/136 |
| 4,837,618 | 6/1989 | Hatori et al. | 358/135 |
| 4,862,264 | 8/1989 | Wells et al. | 358/138 |
| 4,887,156 | 12/1989 | Ohki | 358/133 |
| 4,897,720 | 1/1990 | Wu et al. | 358/136 |
| 4,933,759 | 6/1990 | Van der Meer et al. | 358/105 |
| 4,942,465 | 7/1990 | Ohta | 358/133 |

OTHER PUBLICATIONS

"Scene Adaptive Coder", Chen and Pratt, *IEEE Transactions on Communication*, vol. COM-32, No. 3, Mar. 1984.
"Fixed and Adaptive Predictors for Hybrid Predictive/Transform Coding", Ericsson, *IEEE Transactions on Communications*, vol. COM-33, No. 12, Dec. 1985.
"A Motion-Compensated Interframe Coding Scheme for Television Pictures", Ninomiya and Ohtsuka, *IEEE Transactions on Communications*, vol. COM-30, No. 1, Jan. 1982.

*Primary Examiner*—Howard W. Britton
*Attorney, Agent, or Firm*—Barry R. Lipsitz

[57] ABSTRACT

A method and apparatus are provided for processing digital video signals for transmission in a compressed form. A set of pixel data is compressed without motion compensation to provide a first compressed video signal. The pixel data is compressed using motion compensation to provide a second compressed video signal. The data in the first and second compressed video signals is quantified. A comparison is made to determine which of the signals contains the least data. Successive sets of pixel data are sequentially compressed and quantified and the compressed video signal having the least data for each particular set is selected. The selected signals are encoded to identify them as motion compensated or non-motion compensated signals, and combined to provide a compressed video signal data stream for transmission. Apparatus for receiving and decoding the signals is also disclosed.

25 Claims, 3 Drawing Sheets

ADAPTIVE MOTION COMPENSATION FOR DIGITAL TELEVISION

BACKGROUND OF THE INVENTION

The present invention relates to the compression of digital data, and more particularly to a method and apparatus for processing digitized video signals for transmission in a compressed form.

Television signals are conventionally transmitted in analog form according to various standards adopted by particular countries For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video "frames" that together provide a moving picture. In digital television systems, each line of a video frame is defined by a sequence of digital data its referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data. In such systems, differential encoding is used to transmit only the difference between an actual frame and a prediction of the actual frame. The prediction is based on information derived from a previous frame of the same video sequence. Examples of such systems can be found in Ninomiya and Ohtsuka, "A Motion-Compensated Interframe Coding Scheme for Television Pictures", *IEEE Transactions on Communications*, Vol. COM-30, No. 1, January 1982 and Ericsson, "Fixed and Adaptive Predictors for Hybrid Predictive/Transform Coding", *IEEE Transactions on Communications*, Vol. COM-33, No. 12, December 1985, both incorporated herein by reference. In motion compensation systems of the type disclosed in the referenced articles, scene changes or rapid and complex changes from one frame to the next can render effective compression impossible. In such instances, the amount of data resulting from the motion compensation can exceed the original non-motion compensated data. This reduces the efficiencies of the system. Attempts to ameliorate this situation have focused upon the provision of complex and expensive motion and scene change detectors.

It would be advantageous to provide a method and apparatus for improving the performance of motion compensated video signal compression systems that eliminates the need for motion and scene change detectors. The present invention provides such a method and apparatus.

SUMMARY OF THE INVENTION

In accordance with the present invention, apparatus is provided for processing digital video signals for transmission in a compressed form. First means compress a set of pixel data without motion compensation to provide a first compressed video signal. Second means compress the set of pixel data using motion compensation to provide a second compressed video signal. The data in the first and second compressed video signals is quantified. The compressed video signal containing the least data is then selected.

In a preferred embodiment, successive sets of pixel data are sequentially compressed and quantified. The compressed video signal having the least data for each particular set is then selected. The selected signals are encoded to identify them as motion compensated or non-motion compensated signals. The encoded selected signals are combined to provide a compressed video signal data stream for transmission.

The quantifying means that determines the amount of data in the first and second compressed video signals can comprise a bit counter. In this instance, the selecting means comprises a comparator coupled to the bit counter for comparing the number of bits in the first compressed video signal to the number of bits in the second compressed video signal.

The first and second compressing means can produce respective first and second arrays of transform coefficients for the set of pixel data. Variable length encoder means may be coupled to the first and to the second compressing means for generating codewords for the transform coefficients. Where the quantifying means is placed after the variable length encoder, the bits contained in the codewords for each of the first and second compressed video signals are counted. The selecting means then selects the signal having the fewest code word bits for each set of pixel data.

In a more specific embodiment, the apparatus of the present invention includes means for receiving a digitized video signal containing pixel data defining a sequence of video images (e.g., frames). Each video frame of the video signal is divided into successive blocks of pixel data for processing on a block-by-block basis. Means are provided for presenting the pixel data for a current video frame to the first compressing means. Means are also provided for predicting the pixel data for the current video frame from pixel data of a previous video frame. The predicted pixel data is subtracted from the actual pixel data for the current video frame to produce a set of pixel data representing a prediction error. The prediction error pixel data is presented to the second compressing means. Compressed video signals selected from the second means can be encoded with motion vector data generated by the predicting means.

Switch means are provided for obtaining compressed data from the first compressing means for storage when the first compressed video signal is selected and for obtaining compressed data from the second compressing means for storage when the second compressed video signal is selected. In this manner, the predicting means will always have the appropriate previous video frame data to work with.

Means are provided for decompressing the previous frame data prior to storage. In order to provide a complete frame of data for use by the prediction means when a motion compensated video signal is selected, the switch means provides the predicted pixel data for the frame to an adder for summation with the corresponding decompressed prediction error data from the second compressing means. Conversely, if non-motion compensated data is selected for a current frame, the non-motion compensated data will be stored for use as the previous frame data during the next cycle. In the case of a non-motion compensated video signal, a complete frame of data is output from the first compressing means and the adder is disabled.

Decoder apparatus is disclosed which comprises means for receiving compressed digital video signals transmitted in interspersed blocks of motion compensated pixel data and non-motion compensated pixel data. Means coupled to the receiving means determines whether a particular block of data contained in a received signal is motion compensated or not. This determination is based on the state of a decision bit that is appended to the data block. Motion vector data appended to received motion compensated blocks is also retrieved. Received blocks of data representing a previous video frame are stored. Prediction signals are computed from the retrieved motion vector data and the stored data. The prediction signals are added to the received motion compensated blocks for a current video frame.

In a preferred embodiment, the decoder apparatus decompresses the received blocks of data. The previous video frame data is stored in decompressed form, and the prediction signals are added to the motion compensated blocks after decompression. The decoder apparatus can further comprise means for formatting the decompressed non-motion compensated blocks and the decompressed motion compensated blocks having the prediction signals added thereto into a digitized video signal for input to a video display.

DETAILED DESCRIPTION OF THE INVENTION

The present invention concerns digitally transmitted data. In digital television systems, each line of a video frame is defined by a sequence of pixels. Due to the large amount of pixel data that must be transmitted to define the picture in a television program, it is desirable to compress the data prior to transmission. In one compression technique, motion compensation is used to predict the data for a current frame from data of a previous frame. As used herein, the term "motion compensation" includes the case where the previous frame is used for a prediction, but there is no displacement between the current and previous frame portions of an image being compared for the prediction. In such cases, the motion vector will be zero.

In motion compensation systems, only the data representing the difference between the predicted signal and the actual signal is compressed and encoded for transmission. Motion compensation does not always produce less data. This is particularly true where there is a scene change or when rapid and complex changes occur from one frame to the next.

The present invention combines non-motion compensated pulse code modulated ("PCM") signals with differential pulse code modulated ("DPCM") motion compensated signals. The result of both PCM and DPCM processing on the same data is tested in the encoder portion of the signal transmitter. The method offering the most efficient (i.e., compact) representation over a region of the image is selected for transmission. The decoder at the receiver for the transmitted signal is informed as to whether each block of data is motion compensated or non-motion compensated by including one additional bit in the encoded signal for each block.

Figure 1:
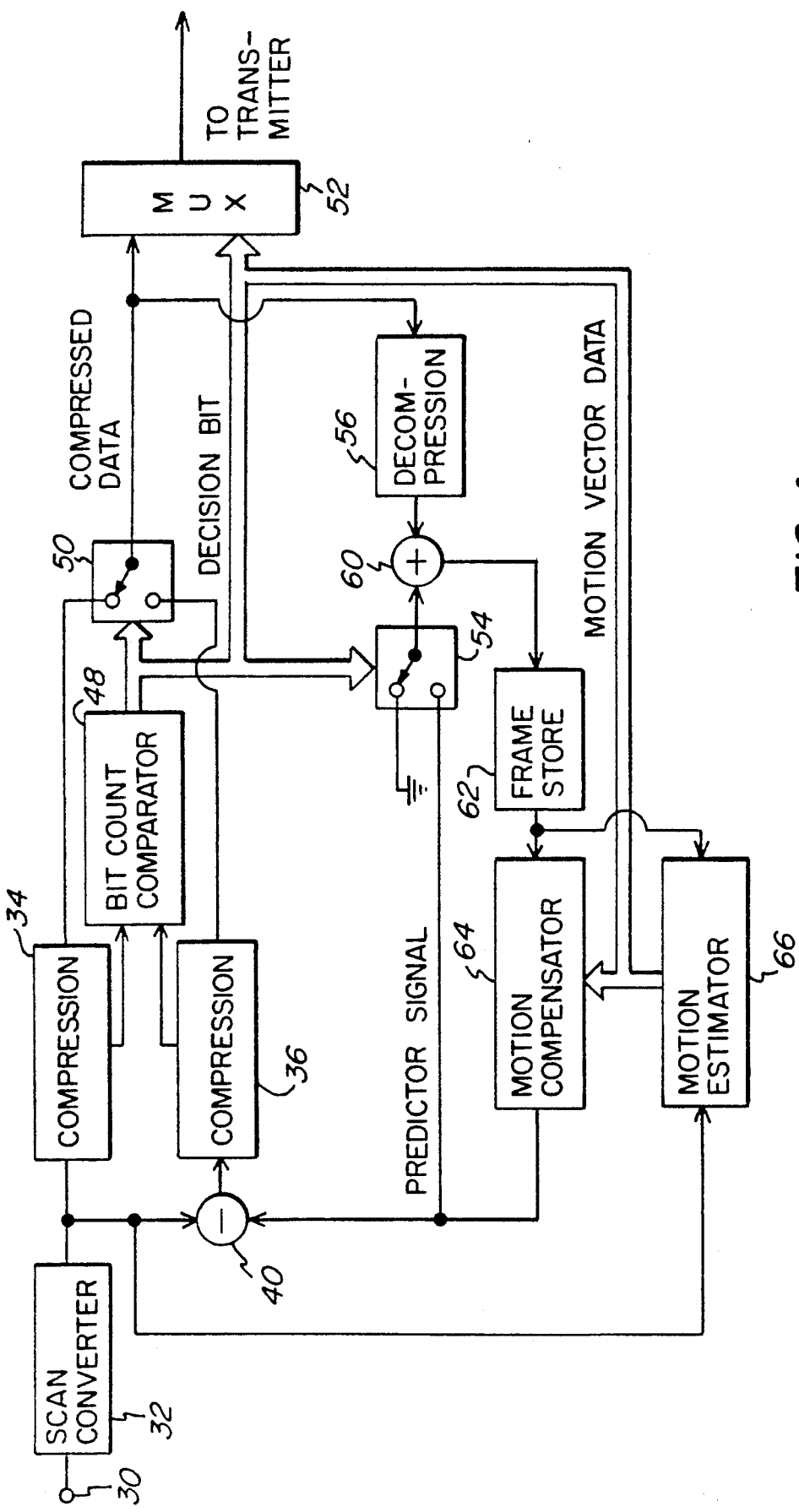
FIG. 1 is a block diagram of encoder apparatus for use at a transmitter in accordance with the present invention.
Figure 2:
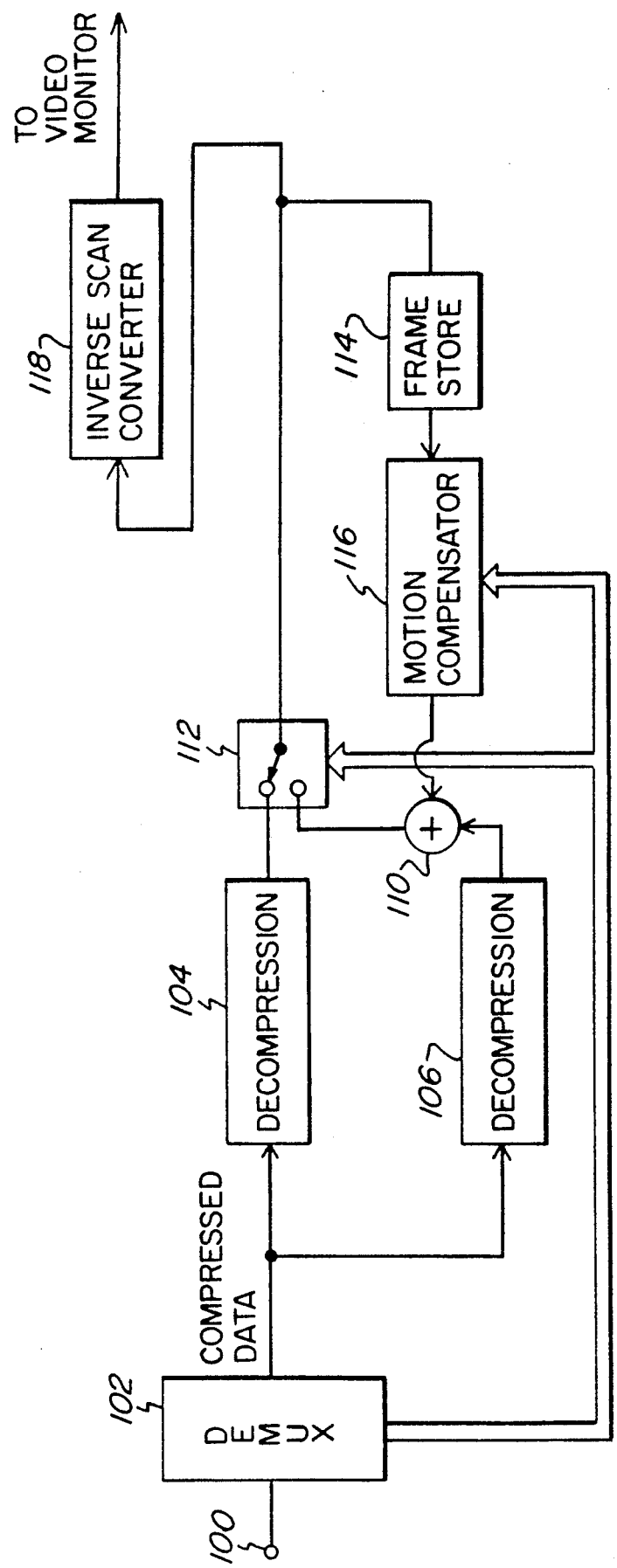
FIG. 2 is a block diagram of decoder apparatus for use at a receiver in accordance with the present invention.

FIG. 1 illustrates an embodiment of an encoder combining both the PCM and DPCM techniques. A corresponding decoder, discussed below, is shown in FIG. 2.

In accordance with the present invention, a video signal such as a standard digitized television signal is input at terminal 30 of the encoder. The signal can be interlaced or non-interlaced. The process of digitizing such video signals is well known in the art. A plurality of separate digitized signals may be provided for the various components, such as luminance and chrominance, of a video signal. When the present invention is used in conjunction with multiple luminance and chrominance components, it is most important that the luminance portion of the video signal take advantage of the adaptive PCM/DPCM processing.

An image defined by the video signal is input at terminal 30 and decomposed by a scan converter 32 into blocks of a size appropriate for data compression. Any of the various data compression techniques well known in the art can be used in accordance with the present invention. The most popular compression technique is known as the Discrete Cosine Transform ("DCT"). This technique is described in Chen and Pratt, "Scene Adaptive Coder", *IEEE Transactions on Communications*, Vol. COM-32, No. 3, March 1984, which is incorporated herein by reference. The following description refers to an 8×8 pixel block size used together with the DCT compression technique. Those skilled in the art will appreciate that other pixel block sizes can be substituted. It will also be appreciated that sets of pixel data other than in block form can be used in accordance with the present invention, and the term "block" as used herein is intended to encompass any data set format without limitation.

Figure 4:
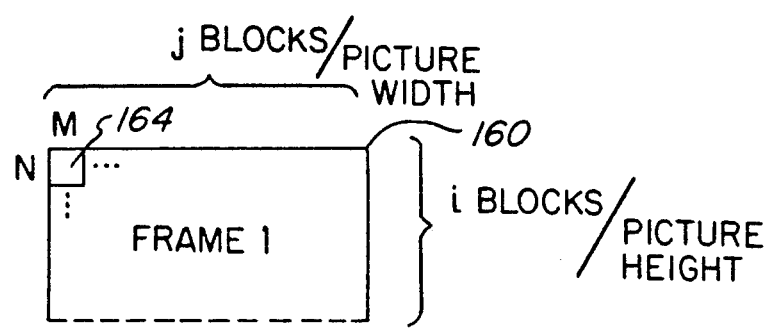
FIG. 4 is a diagram illustrating the format of pixel data blocks output from the scan converter of FIG. 3.

The function of scan converter 32 is to divide each video frame into a plurality of corresponding blocks. Referring to FIG. 4, each block 164 is M pixels wide by N pixels high. It takes j such blocks to cover the width of the picture and i blocks to cover the height of each frame 160. It will be appreciated that other output formats can be provided by a scan converter and used in practicing the present invention.

Figure 3:
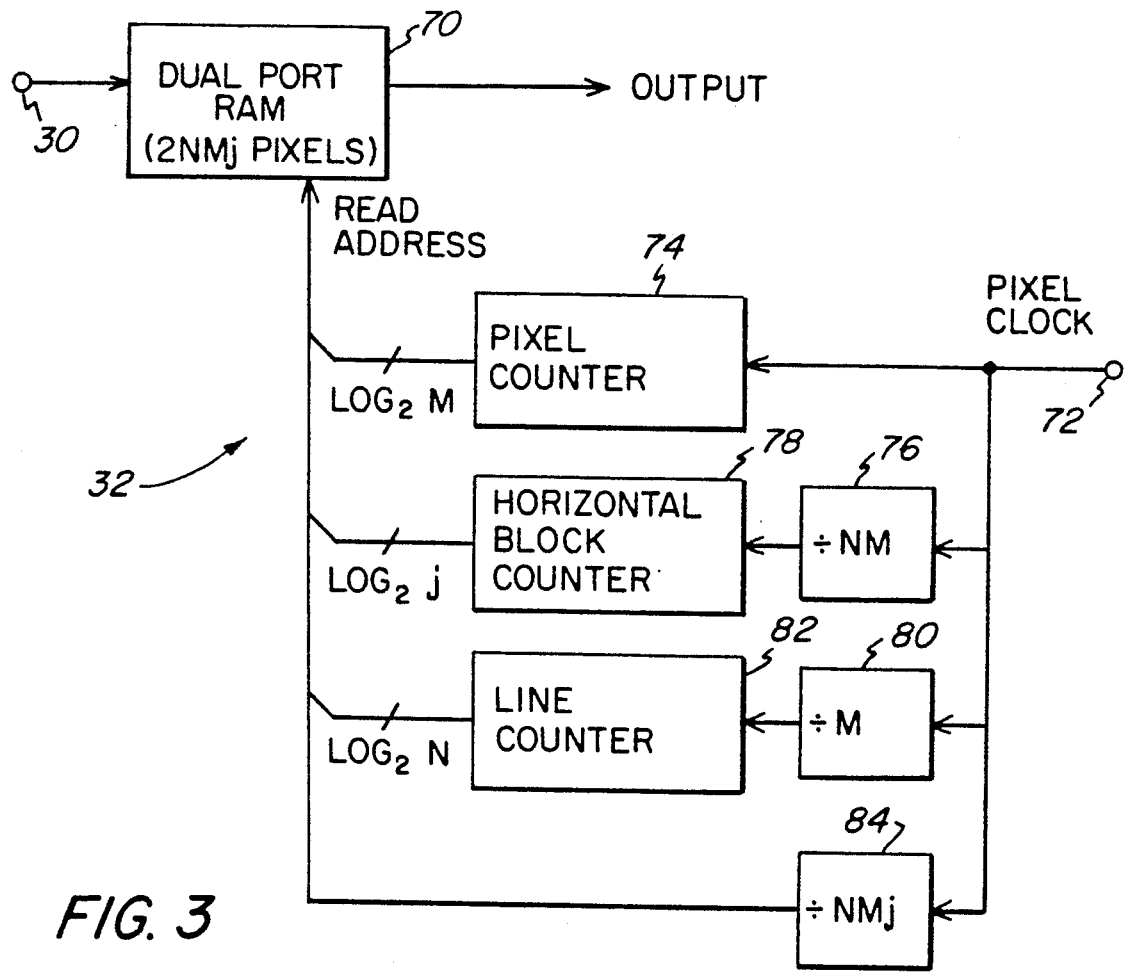
FIG. 3 is a block diagram of circuitry that can be used to perform the function of the scan converter of FIG. 1.

In order to provide the illustrative format described above, scan converter 32 can comprise a dual port RAM 70 as shown in FIG. 3. The data contained in the digitized video signal input at terminal 30 is loaded into RAM 70 in the order received. RAM 70 stores $2 \times N \times M \times j$ pixels of data at a time. A read address is generated to enable the data to be read out of RAM 70 in the desired format. A pixel clock signal input at terminal 72 is coupled to a pixel counter 74 that outputs a digital signal ranging from 0 to $M-1$. This count forms the $\log_2 M$ least significant bits of the dual port RAM read address. A divider 76 and horizontal block counter 78 produce a signal ranging from 0 to $j-1$ and forms the next $\log_2 j$ bits of the read address. Another divider circuit 80 and line counter 82 provide an output ranging from 0 to $N-1$, and forms the next $\log_2 N$ bits of the read address. Finally, divider 84 provides the most significant bit of the dual port RAM address in order to toggle between two locations in the dual port RAM. This is necessary to insure that the read and write address pointers do not conflict. The composite address signal input to RAM 70 requires $1+\log_2 M+\log_2 j+\log_2 N$ bits. For an $8 \times 8$ block size, the pixel and line counters will each require three bits. The number of bits required for the horizontal block counter will depend on the horizontal size of the frame.

The result of the above is that the read address of RAM 70 will be adjusted to output the video data as blocks of pixel data. Those skilled in the art will appreciate that the pixels within each block may be scanned in any order required by the input requirements of the DCT algorithm or other compression device used.

Referring again to FIG. 1, the data output from scan converter 32 is input to two different compression paths. In a first path, the data is processed by compression circuitry 34. For example, a conventional DCT transform coder and normalizer can be used. The normalization process truncates the transform coefficient data by deleting unnecessary least significant bits and shifting the remaining data to the right. Those skilled in the art will appreciate that any other compression technique(s) can be substituted for the DCT compression described.

In a second compression path, a predictor signal is subtracted from the data output by scan converter 32. The subtraction occurs at subtracter 40, and the resultant data is input to a compression circuit 36 which may use the same or a different compression algorithm than that used by compression circuit 34 in the first compression path.

The predictor signal subtracted from the video data in the second compression path is obtained by applying motion compensation to the previous frame as it appears after processing and reconstruction. In the case where displacement is accounted for, the motion compensation process first requires the estimation of motion between the current frame and a previous frame. This information is then used to displace the previous frame in such a way that it more closely resembles the current frame. The process is described in more detail in the article by Ninomiya and Ohtsuka referred to above.

In accordance with the present invention, compressed data from the first or second compression path is decompressed using conventional circuitry 56. Where the same compression algorithm is used in the first and second compression paths, decompression circuity 56 will apply the inverse of that algorithm. When different algorithms are used, circuitry 56 will be switched via a decision bit to provide the appropriate decompression algorithm. The resultant decompressed data is summed at adder 60 with the predictor signal output from motion compensator 64 when the data has been selected from the second compression path. If data is selected from the first compression path, the predictor signal is not added back in at adder 60 because it was never subtracted in the first compression path. In order to properly process data selected from the first and second compression paths, the motion compensation circuitry is provided with a switch 54, the operation of which is described in more detail below.

The signal output from adder 60 comprises blocks of pixel data that are input to a frame store 62. When all of the blocks representing a current frame are stored in frame store 62, the apparatus is ready to receive a new frame of data via input terminal 30. At this point, the new data is referred to as the "current frame" and the data stored in frame store 62 is referred to as the "previous frame".

Motion compensator 64 and motion estimator 66 are conventional components that are used to predict the current frame data from the previous frame data. Block displacement information, indicative of the location of a previous block that best matches a current block of pixel data within a predefined area, is determined by motion estimator 66 which inputs corresponding motion vector data (x,y) to motion compensator 64. In a case where there is no displacement between the current frame block and previous frame block used for the prediction, the motion vector will be zero. In accordance with the present invention, the motion vector data is also input to a multiplexer 52 which appends it to the video signals output from the encoder for use in deriving an identical prediction signal at a receiver.

Once the non-motion compensated data is compressed in the first compression path and the motion compensated data is compressed in the second compression path, the encoder decides which stream to use for transmission. The decision is based on the amount of data contained in each of the compressed signals. Bit count comparator 48 is used to make the determination. The total number of bits produced in the first compression path is compared to the total number of bits produced in the second compression path over a block or other specified region of the video image. The bit stream having the fewest bits is selected. The selection is identified by a decision bit output from bit comparator 48. The decision bit (e.g., a "0" for non-motion compensated data and a "1" for motion compensated data) is used to actuate switches 50 and 54. The decision bit is also multiplexed with the encoded video output from the encoder for transmission and is used by a receiver to determine whether each received block of data is motion compensated or not.

Bit count comparator 48 can comprise a well known hardware bit counter coupled to a comparator. Alternately, its functions can be implemented in software using techniques well known in the art. When the decision bit output from bit count comparator 48 indicates that the first compression path (non-motion compensated) produced the least data for a given block, switch 50 is set to couple this block from the first compression path to multiplexer 52. When the decision bit indicates that the second compression path (motion compensated) produced the least data, switch 50 is set to couple the second compression path to multiplexer 52. The compressed data, decision bit, and motion vector data (in the case of motion compensated data) is multiplexed at multiplexer 52 and output to a conventional transmitter for data transmission.

The decision bit also actuates switch 54 to add the predictor signal to the decompressed data to be stored in frame store 62 when the motion compensated path is chosen. When non-motion compensated data is selected, switch 54 sets one input of adder 60 to zero.

FIG. 2 illustrates a decoder that can be used at a receiver for reconstructing the video signal. Processing at the decoder is greatly simplified by the multiplexing of the decision bit and motion vector data with the encoded video at the transmitter. The received signal is input at terminal 100 and coupled to a demultiplexer 102 that strips the decision bit and motion vector data from the incoming signal. The compressed data is then input to a first decompression path comprising decompression circuitry 104 corresponding to first compression path circuitry 34. The data is also input to a second decompression path containing circuitry 106 corresponding to second compression path circuitry 36. If motion compensated data was transmitted, the decision bit actuates switch 112 to input the decompressed data from the second decompression path to an inverse scan converter 118, with the predictor signal added to the decompressed data via adder 110. The predictor signal is obtained by displacing the previous frame data stored in frame store 114 using the same motion vectors that were derived at the encoder. Motion compensator 116 then outputs the predictor signal to adder 110. In the event a received block of data is not motion compensated, the decision bit actuates switch 112 to couple the output of decompression circuitry 104 in the first decompression path to inverse scan converter 118.

Inverse scan converter 118 is a memory device that formats the decompressed signals into a digitized video signal that is compatible with existing video display formats. In a preferred embodiment, it restores the pixels back to the original raster scan order. The output of inverse scan converter 118 is then the recovered, reconstructed digitized video signal originally input to the encoder. This output signal can be converted to analog form and coupled to a video monitor for display of the video program.

In the event the same compression algorithm is used in both the first and second encoder compression paths, only one decompression circuit will be required in the decoder. In this event, a switch similar to encoder switch 54 is provided at adder 110 in the decoder, to selectively add the predictor signal to the decompressed data when motion compensation is used.

It will now be appreciated that the present system provides a system for adaptively combining PCM coding (non-motion compensated) with DPCM coding (motion compensated) by first subdividing an image into regions or blocks. The method that allows the region or block to be encoded using the least number of bits to achieve a fixed level of accuracy is then selected. Blocks compressed using the selected method are combined to provide a digital data stream for transmission. Optimal detection and processing of whole or partial scene changes is thereby provided. Large fluctuations in the bit rate are avoided by using the minimum bit rate criterion of the present invention to select between PCM and DPCM encoding on a local basis. By applying the present techniques over an entire image, compression in both moving and non-moving regions is maximized without the use of motion detectors.

Although the present invention has been described in connection with a preferred embodiment thereof, those skilled in the art will appreciate that numerous modifications and adaptations may be made thereto without departing from the spirit and scope of the invention as set forth in the following claims.

We claim:

1. Apparatus for processing digital video signals for transmission in a compressed form comprising:
   first means for compressing a set of pixel data to provide a first compressed video signal suitable for transmission;
   second means for compressing said set of pixel data to provide a second compressed video signal suitable for transmission;
   bit counter means coupled to said first means for quantifying the data in the first compressed video signal and coupled to said second means for quantifying the data in the second compressed video signal; and
   comparator means coupled to said bit counter means for selecting the compressed video signal containing the least data by comparing the number of bits in said first compressed video signal to the number of bits in said second compressed video signal.

2. Apparatus in accordance with claim 1 further comprising:
   means for encoding the selected signals to identify them as first compressed or second compressed video signals.

3. Apparatus in accordance with claim 1 wherein:
   successive sets of pixel data are sequentially compressed and quantified; and
   said selecting means selects the compressed video signal having the least data for each particular set.

4. Apparatus in accordance with claim 2 wherein said first means compresses said set of pixel data without motion compensation to provide the first compressed video signal and said second means compresses said set of pixel data using motion compensation to provide the second compressed video signal, said apparatus further comprising:
   means for encoding the selected signals to identify them as motion compensated or non-motion compensated signals.

5. Apparatus in accordance with claim 4 further comprising:
   means for combining the encoded selected signals to provide a compressed video signal data stream for transmission.

6. Apparatus in accordance with claim 1 further comprising:
   means for receiving a digitized video signal containing pixel data defining a sequence of video images;

means for presenting the pixel data for a current video image to said first compressing means;

means for predicting the pixel data for said current video image from pixel data of a previous video image;

means for subtracting the predicted pixel data from the actual pixel data for the current video image to produce a set of pixel data representing a prediction error; and means for presenting the prediction error pixel data to said second compression means.

7. Apparatus in accordance with claim 6 further comprising:

means for encoding the signals selected by said selecting means to identify them as non-motion compensated signals from said first compression means or motion compensated signals from said second compression means.

8. Apparatus in accordance with claim 6 further comprising:

means for dividing each video image of the digitized video signal into successive blocks of pixel data for processing on a block-by-block basis by said presenting, predicting, subtracting, compression, quantifying and selection means.

9. Apparatus in accordance with claim 8 further comprising:

means for encoding the signals selected by said selecting means to identify them as first compressed or second compressed video signals.

10. Apparatus in accordance with claim 9 further comprising:

means for encoding compressed video signals selected from said second means with motion vector data generated by said predicting means.

11. Apparatus in accordance with claim 10 further comprising:

means for combining the encoded selected signals to provide a compressed video signal data stream for transmission.

12. Apparatus in accordance with claim 6 further comprising:

switch means for obtaining compressed data from said first compressing means when the first compressed video signal is selected and for obtaining compressed data from said second compressing means when the second compressed video signal is selected; and means coupled to said switch means for decompressing the data obtained by said switch means for use by said predicting means.

13. Apparatus in accordance with claim 12 further comprising means for summing the predicted current image pixel data with the decompressed data obtained by said switch means when the second compressed video signal is selected.

14. Apparatus in accordance with claim 13 further comprising:

means for dividing each video image of the digitized video signal into successive blocks of pixel data for processing on a block-by-block basis by said presenting, predicting, subtracting, compression, quantifying, selection, decompressing, and switch means.

15. Apparatus in accordance with claim 14 further comprising:

means for encoding each block with a decision bit generated by said selecting means.

16. Apparatus in accordance with claim 15 further comprising:

means for encoding each selected block of data from said second compressing means with motion vector data generated by said predicting means.

17. Decoder apparatus comprising:

means for receiving compressed digital video signals transmitted as intersperced blocks of motion compensated pixel data and non-motion compensated pixel data;

means coupled to said receiving means for decompressing the received blocks of data;

means coupled to said receiving means for determining whether a particular block of data contained in a received signal is motion compensated or not;

means for retrieving motion data relating to received motion compensated blocks;

means coupled to said decompression means for storing decompressed blocks of received data representing a previous video image;

means for computing prediction signals from the retrieved motion data and the stored decompressed data; and means responsive to said determining means for adding said prediction signals to the received and decompressed motion compensated blocks for a current video image.

18. Decoder apparatus in accordance with claim 17 further comprising:

means for formatting the decompressed non-motion compensated blocks and the decompressed motion compensated blocks with said prediction signals into a digitized video signal compatible with an existing video display format.

19. A digital television system for processing blocks of pixel data to produce television pictures comprising:

first means for compressing blocks of pixel data without motion compensation;

second means for compressing said blocks of pixel data with motion compensation;

bit counter means for quantifying the compressed data from said first and second compression means;

comparator means coupled to said bit counter means for selecting the compressed data containing the fewest bits for each block by comparing the number of bits in the compressed data from said first and second compression means;

means for encoding the selected data for each block to identify it as non-motion compensated or motion compensated; and means for combining the encoded selected data to provide a compressed video data stream for transmission by a transmitter.

20. The system of claim 19 further comprising:

means for encoding the selected data for each motion compensated block with motion data.

21. The system of claim 20 further comprising:

receiver means for receiving a compressed video data stream from said transmitter;

means operatively associated with said receiver means for decoding the encoded data to identify motion compensated blocks and non-motion compensated blocks;

means for retrieving said motion data from the motion compensated blocks;

means for decompressing the received blocks; and means responsive to said decoding means for adding prediction signals, derived from the motion data and previous blocks of data, to current decompressed motion compensated blocks of data.

22. A method for encoding television signals for digital transmission comprising the steps of:
   dividing a digitized video signal into blocks of pixel data;
   compressing said blocks in a first path to provide a first compressed video signal;
   compressing said blocks in a second path to provide a second encompassed video signal;
   quantifying the data in said first and second compressed video signals by determining the number of bits produced by said compressing means for equivalent portions of the pixel data;
   selecting, for each block, the compressed video signal containing the least number of bits;
   encoding the selected signals to identify them as first path or second path signals; and
   combining the encoded signals.

23. A method for decoding the combined encoded signals produced by the method of claim 22, comprising the steps of:
   decompressing the selected first compressed video signals in a decompression path corresponding to said first path;
   decompressing the selected second compressed video signals in a decompression path corresponding to said second path; and
   formatting the decompressed signals to recover the digitized video signal.

24. A method in accordance with claim 22 comprising the further steps of:
   predicting the pixel data for a current video image contained in said video signal from pixel data of a previous image;
   subtracting said predicted pixel data from the actual pixel data for the current image to provide an abbreviated set of pixel data for compression into said second compressed video signal; and
   encoding the second compressed video signals with motion vector data generated during said prediction step;
   wherein said second compressed video signals are motion compensated.

25. A method for decoding the combined encoded signals produced by the method of claim 24, comprising the steps of:
   decompressing the selected signals;
   retrieving said motion vector data from the motion compensated signals representing a current video image;
   storing data representing a previous video image;
   computing prediction signals from the retrieved motion vector data and the stored data;
   adding said prediction signals to the decompressed motion compensated signals; and
   formatting the decompressed signals to recover the digitized video signal.

* * * * *